Jan. 10, 1933.  G. A. MITCHELL  1,893,712
CAMERA FOCUSING MECHANISM
Filed June 9, 1931   2 Sheets-Sheet 1

Inventor
George A. Mitchell.
Attorney.

Jan. 10, 1933.  G. A. MITCHELL  1,893,712
CAMERA FOCUSING MECHANISM
Filed June 9, 1931   2 Sheets-Sheet 2
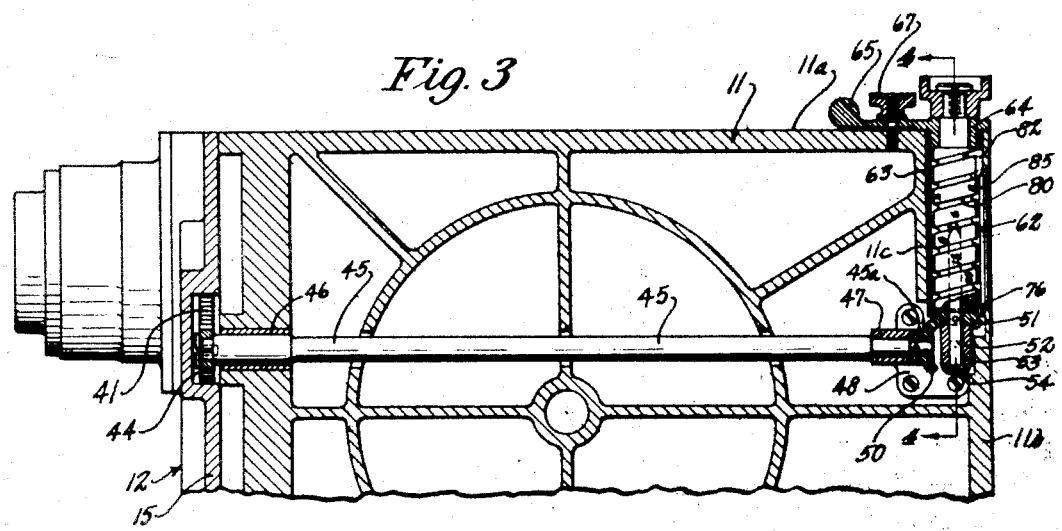
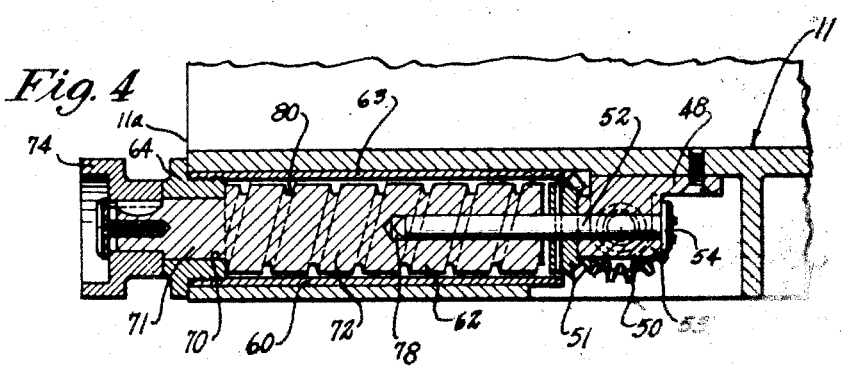
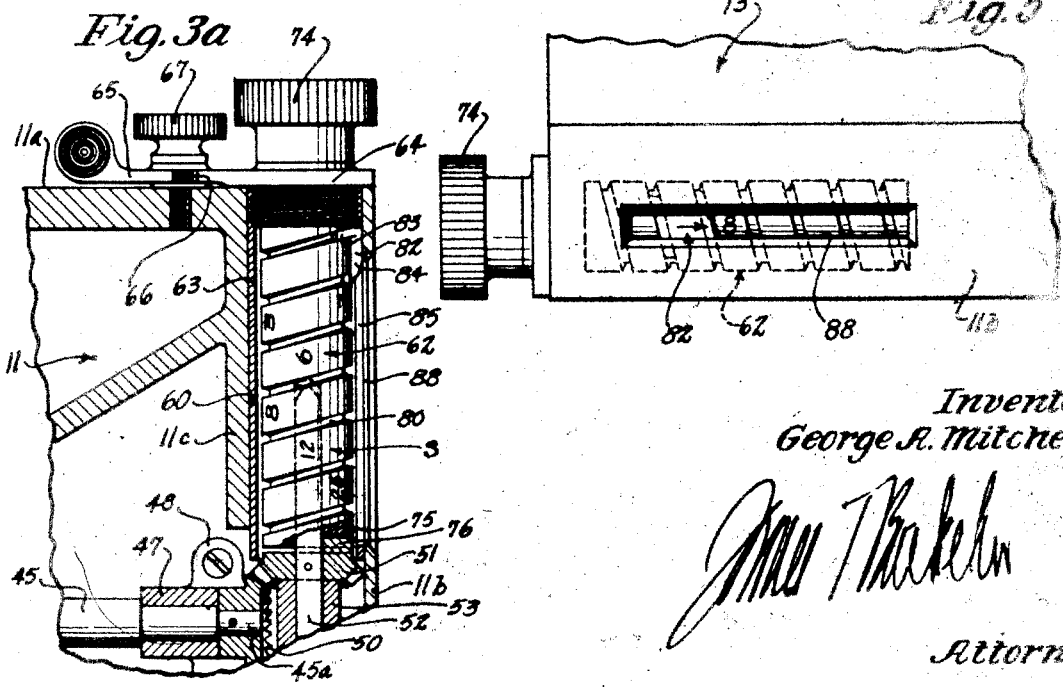
Inventor
George A. Mitchell.
Attorney.

Patented Jan. 10, 1933

1,893,712

UNITED STATES PATENT OFFICE

GEORGE A. MITCHELL, OF WEST HOLLYWOOD, CALIFORNIA, ASSIGNOR TO MITCHELL CAMERA CORPORATION, OF WEST HOLLYWOOD, CALIFORNIA, A CORPORATION OF DELAWARE

CAMERA FOCUSING MECHANISM

Application filed June 9, 1931. Serial No. 543,108.

This invention has to do generally with lens focusing means of optical instruments such as motion picture cameras and the like. The invention has its major present application to motion picture cameras and will therefore be described with that application principally in view, but without limitation thereto.

Motion picture cameras are frequently equipped with means for focusing the photographic lens from a position at the rear of the camera, a focusing scale calibrated in distance and an indicator being provided at the rear of the camera to enable the operator accurately to focus the lens on an object, or to follow approaching or receding action, from such position. There are ordinarily provided a number of photographic lenses of varying focal lengths for use under varying circumstances, and it is necessary to provide an individual distance scale for each such lens.

It is an object of the present invention to provide an improved remote focusing mechanism for a motion picture camera, in which the distance scale members are quickly removable from the camera, there being furnished individually calibrated scale members for the several photographic lenses of the camera which are changed as the photographic lenses are changed.

It is a further object of the invention to provide a focusing mechanism which is so geared down that the manual operating member of the mechanism has an exceptionally long range of movement, and with which there is a correspondingly long distance scale, so that extremely accurate focusing is facilitated.

It is a further object of the invention to provide a mechanism characterized by extreme simplicity and compactness, as well as one which can be both operated and read with facility and convenience.

In accordance with the preferred embodiment of the invention, stated briefly, there is provided for the camera a set of focusing members, each of which carries a spiral distance scale calibrated for one of the photographic lenses of the camera, for which scale there is a moving indicator member. These focusing members are removably mounted in the camera and connectible with the lens focusing mechanism, and are properly changed in the camera as the photographic lenses are changed.

The invention itself will be best understood without further preliminary discussion from the following detailed description of a present preferred embodiment thereof, reference for this purpose being had to the accompanying drawings, in which:

Fig. 3 is a horizontal section taken as indicated by line 3—3 of Fig. 1;

Fig. 3a is an enlargement of a portion of Fig. 3;

Fig. 4 is a section taken as indicated by line 4—4 of Fig. 3;

Fig. 5 is a fragmentary rear end elevation of the camera; and

Figure 1:
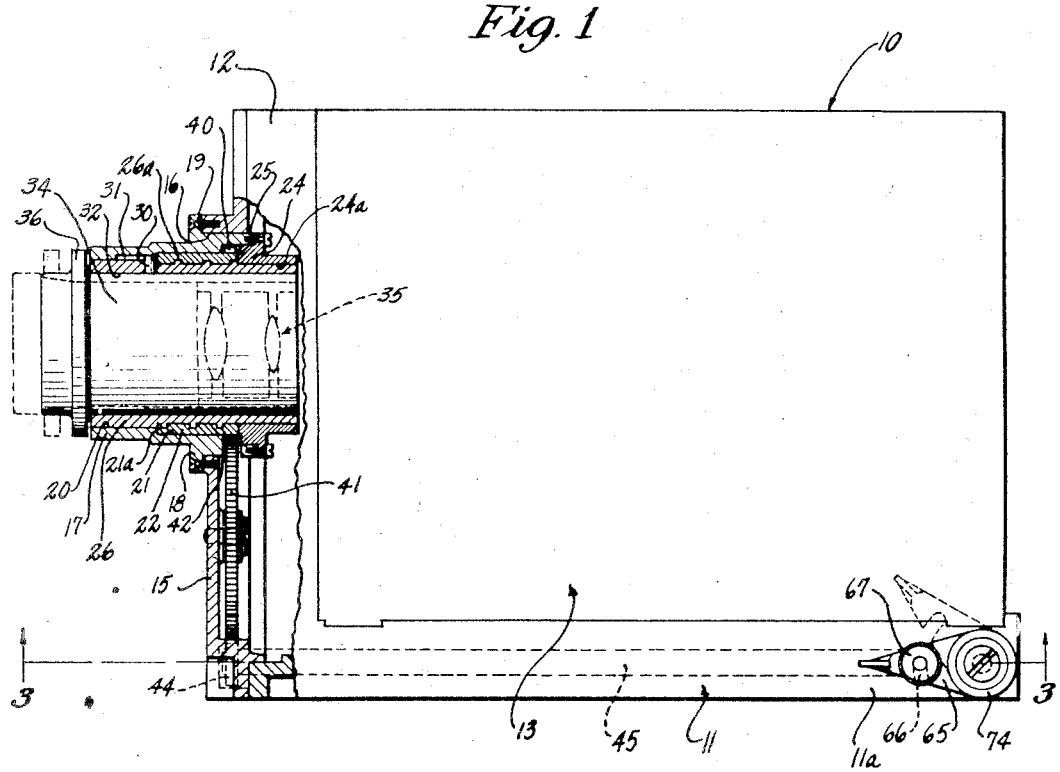
Fig. 1 is a side elevation of a motion picture camera equipped with my improvements, parts being broken away to show underlying parts in section.
Figure 2:
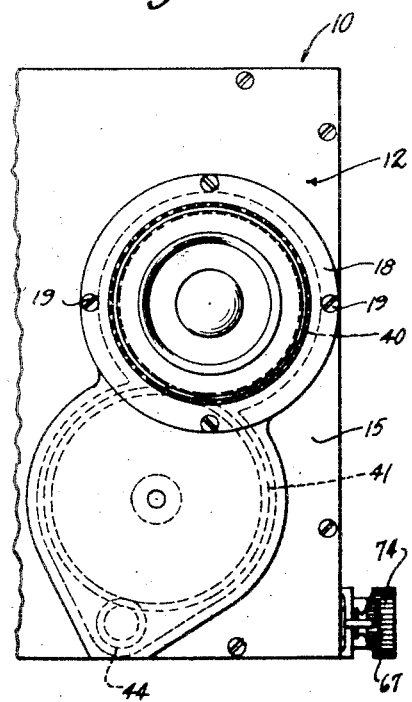
Fig. 2 is a fragmentary front elevation of the camera.

In the accompanying drawings I illustrate, more or less conventionally, a typical motion picture camera to which the present invention may be applied, but it will be understood the invention may be incorporated in a design with any other type of camera as well.

Referring now to the drawings, I indicate at 10 a motion picture camera, embodying a base 11 having a head 12 extending upwardly from its forward end, and a body 13 carried by base 11 to the rear of head 12.

Head 12 embodies a front plate 15 having a circular opening 16 within which is taken a lens-mount supporting barrel 17, said barrel having an annular flange 18 fastened by screws 19 to front plate 15. Barrel 17 has a bore 20, and a larger counterbore 21 within which is rotatably mounted an internally screw-threaded ring 22, the inner end of said ring 22 coming against the shoulder 21a at the inner end of counterbore 21. A ring 24 fastened by screws 25 to the rear end of barrel 17 overhangs the screw threaded ring 22 to confine and position laterally within the barrel.

Mounted for longitudinal movement within bore 21 of barrel 17 and bore 24a of ring 24, is a carrier tube 26, said tube having screw threaded engagement at 26a with the internally threaded ring 22. Tube 26 carries a pin 30 guided by a longitudinal groove 31 in barrel 17, so that the tube can move longitudinally but not rotatably in barrel 17, it following that rotation of the ring 22 screw-threaded to said tube causes it to move longitudinally in barrel 17.

Within bore 32 of tube 26 is taken the lens mount tube 34, within which is mounted the photographic lens assembly, indicated at 35. This lens tube 34 is simply slipped within the bore of the carrier tube 26 and is held therein by friction, there being formed on the lens tube an annular flange 36 that shoulders up against the outer end of the carrier tube to locate the lens tube accurately therein. When a lens in the camera is to be changed, the lens tube 34 is merely pulled out of the carrier tube 32 and replaced by another.

It will now be understood how rotation of ring 22 causes longitudinal movement of carrier tube 26 and therefore of lens tube 34, and the means for so rotating ring 22 will now be described. Formed around the periphery of ring 22 are gear teeth 40, which mesh with a spur gear 41 mounted below ring 22 on a shaft journaled in front plate 15, gear 41 reaching gear teeth 40 through a suitable aperture 42 cut in the wall of barrel 17. Gear 41 meshes, in turn, with a smaller spur gear 44. Gear 44 is mounted on the forward end of a shaft 45 journaled in a bearing 46 provided in the forward end of base 11, said shaft extending rearwardly through base 11 to a point just short of the rear wall 11b of the camera base, the rear end of the shaft being journaled in a bearing 47 mounted on a plate 48 affixed to the underside of the base, as clearly shown in Figs. 3 and 4.

Mounted on the reduced rear end 45a of shaft 45 is bevel gear 50 that meshes with a bevel gear 51 set on a transverse shaft 52, shaft 52 being mounted in a horizontal bearing 53 also carried by plate 48. One end of bearing 53 is adjacent the bevel gear 51 on shaft 52, while the shaft 52 has a head 54 adjacent the other end of bearing 53. Shaft 52 extends horizontally from gear 51 toward the side of the camera, but terminates short thereof, as clearly shown in Fig. 4. The stock 11c at the rear of base 11 is drilled through from the outer side face 11a of the base with a horizontal bore 60 that extends inwardly in axial alinement with shaft 52, the stock through which this bore is made being cut away so as to terminate short of bevel gear 51, as clearly shown in Fig. 3.

Removably inserted and locked within this bore is the manual focusing unit, generally designated at 62. This unit 62 includes an encasing sleeve 63 that slidably fits within bore 60. Screw-threaded within the outer end of said sleeve 63 is a head 64, which is provided with an extension arm 65 having a notch 66 adapted to take a clamping screw 67 set into the side of base 11. To insert the unit 62 in the camera, sleeve 63 is slipped into bore 60 with arm 65 rotated to the position shown in dotted lines in Fig. 1, and when the sleeve is home arm 65 is hooked down over screw 67, which is then set up. Head 64 has an axial bore 70 within which is rotatably mounted the reduced outer end 71 of a cylindrical member 72 extending inwardly within sleeve 63. Mounted on the outer end of said end part 71 is an operating knob 74, while cut in the inner end of member 72 is a keyway 75 adapted to take a key 76 formed on bevel gear 51 to make an operative connection therewith when the unit is inserted in the camera. The inner end of member 72 is drilled with an axial bore 78 to take shaft 52, so that member 72 is journaled at one end in head 64, and mounted at the other end on shaft 52.

It will now be obvious how rotation of member 72 by means of knob 74 acts through the key connection with bevel gear 51 and thence through the described interconnections to move the lens tube through its focusing range, for instance, between the dotted line and full line positions of Fig. 1.

Figure 6:
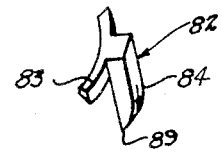
Fig. 6 is a perspective detail of the traveling scale indicator.

The distance scale is calibrated in a spiral about the cylindrical surface of the rotatable member 72, as later to be described, and an indicator member is provided which rides back and forth along this scale. For this purpose the cylindrical surface of member 72 is cut with a helical groove 80 that encircles the member, for instance, approximately six times. Guided by this groove is a rider or traveling indicator member 82, shown in perspective in Fig. 6. This member 82 has a screw-thread element 83 that is taken within the helical groove 80 of member 72 and is confined therein by the inner surface of sleeve 63, and a projecting bar part 84 that is guided between the sides of a longitudinal slot 85 provided in the side wall of sleeve 63, as clearly shown in Fig. 3a.

The sleeve slot 85 is arranged to be opposite the rear wall 11b of the camera base when the unit is locked in position, and an opening 88 is provided in said rear wall directly opposite slot 85 so that rider bar 84 and a limited extent of the surface of member 72 may be viewed therethrough. The distance scale S for the lens is then calibrated in a long spiral around member 72, following the helical groove 80 therein. The rider bar 84 is beveled down to a thin edge 89 directly over this scale, and is provided with an indicating arrow, as shown.

When knob 74 of cylindrical focusing member 72 is rotated, helical groove 80 of said member 72 causes the rider, guided by slot 85, to move longitudinally over member 72, member 72 thus acting as a lead screw, while the spiral scale inscribed at the side of groove 80 turns progressively past the indicating arrow on the moving rider. It will be understood that if the scale is properly calibrated on the cylinder for a given lens, and the focusing member properly connected with the lens carrier drive, the indicating arrow will always point to the distance mark at which the lens is focused.

In accordance with the present embodiment of the invention, approximately six revolutions of the screw are required to move the lens between close-up and infinity positions, and the distance scale is therefore of a length of 6π times the diameter of the screw, thus giving a scale of comparatively long length and with which accurate focusing may be accomplished, as will be readily apparent.

The screw member 72, encasing sleeve 63, and indicating element or rider 82 will be seen to comprise a single removable unit, the distance scale on a given unit being calibrated in accordance with a particular photographic lens, and one such unit may be provided for each lens to be used in the camera.

It will be understood the drawings and description are to be considered merely as illustrative of and not restrictive on the broader claims appended hereto, for various changes in design, structure and arrangement may be made without departing from the spirit and scope of said claims.

I claim:

1. In combination with an optical instrument having a body and a lens carrier mounted therein movably for focusing, lens focusing means, and indicator means connected to the focusing means and embodying a calibrated rotatable spiral, and a longitudinally moving indicator member engaging the spiral to be moved thereby.

2. In combination with an optical instrument having a body and a lens carrier mounted therein movably for focusing, lens focusing means, and indicator means connected to the focusing means and embodying a rotatable cylindric spiral, and a longitudnally moving indicator member engaging the spiral to be moved thereby.

3. In combination with an optical instrument having a body and a lens carrier mounted therein movably for focusing, lens focusing means, and indicator means connected to the focusing means and embodying a calibrated rotatable cylindric spiral, and a longitudinally moving indicator member engaging the spiral to be moved thereby.

4. In combination with an optical instrument having a body and a lens carrier movably mounted therein, lens focusing means comprising a manually rotatable screw member mounted for rotation in said camera body, operative interconnecting means between said screw member and said lens carrier, a distance scale calibrated in a spiral on said screw member, and an indicator member for the distance scale screw-threadedly associated with said screw and constrained to move longitudinally of the screw when the screw is rotated.

5. In combination with an optical instrument having a body and a lens carrier movably mounted therein, lens focusing means comprising a manually rotatable screw member mounted for rotation in said camera body, disengageable operative interconnecting means between said screw member and said lens carrier, a distance scale calibrated in a spiral on said screw member, and an indicator member for the distance scale screw-threadedly associated with said screw and constrained to move longitudinally of the screw when the screw is rotated.

6. In combination with an optical instrument having a body and a lens carrier movably mounted therein, lens focusing means including a manually rotatable screw member mounted for rotation in said camera body, operative interconnection means between said screw and said lens carrier, said screw being disengageable from said interconnection means and removable from the camera body, an indicator member screw-threadedly associated with said screw and guided to move longitudinally of the screw when the screw is rotated, and a distance scale associated with said indicator member.

7. In combination with an optical instrument having a body and a lens carrier movably mounted therein, lens focusing means including a cylindric manually rotatable focusing member mounted for rotation, operative interconnecting means between said focusing member and said lens carrier, said focusing member having a spiral groove around its cylindric surface, a distance scale on the spiral surface of the focusing member, an indicating member for said scale having a screw-thread element working in said spiral groove, and means constraining said indicating member to motion in a direction longitudinal of the cylindric focusing member, so that rotation of the focusing member causes translation of the indicating member to follow along the spiral distance scale of the focusing member.

8. In combination with an optical instrument having a body and a lens carrier movably mounted therein, lens focusing means including a cylindric manually rotatable focusing member mounted for rotation in said camera body, operative interconnecting means between said focusing member and said lens carrier, said focusing member having a spiral groove around its cylindric surface, a distance scale on the spiral surface of the focusing member, an indicating member for said scale having a screw-thread element working in said spiral groove, and means constraining said indicating member to motion in a direction longitudinal of the cylindric focusing member, so that rotation of the focusing member causes translation of the indicating member to follow along the spiral distance scale of the focusing member.

9. In combination with an optical instrument having a body and a lens carrier movably mounted therein, lens focusing means including a tube removably received in the camera body, said tube having a longitudinal slot, a manually operable cylinder rotatably mounted in said tube, disengageable operative interconnecting means between said cylinder and said movable lens carrier, there being a spiral groove on said cylinder, an indicating member screw threadedly engaging said spiral groove and arranged for translation in the longitudinal slot in said tube when the cylinder is rotated, and a distance scale followed by said traveling indicating member.

10. In combination with an optical instrument having a body and a lens carrier movably mounted therein, lens focusing means including a tube removably received in the camera body, said tube having a longiudinal slot, a manually operable cylinder rotatably mounted in said tube, disengageable operative interconnecting means between said cylinder and said movable lens carrier, there being a spiral groove in the surface of said cylinder, a distance scale on the spiral surface of said cylinder, and a scale indicating member having a screw thread element engaging said spiral groove and a projecting part working in the longitudinal slot in the cylinder carrying tube.

11. In combination with an optical instrument having a body and a lens carrier movably mounted therein, lens focusing means comprising a tube removably received in the camera body, said tube having a longitudinal slot, means for releasably clamping the tube in the camera body, a manually operable cylinder rotatably mounted in said tube, disengageable operative interconnecting means between said cylinder and said movable lens carrier, a screw thread cut on said cylinder, an indicating member screw threadedly engaging said cylinder and arranged for translation in the longitudinal slot in said tube when the cylinder is rotated, and a distance scale followed by said traveling indicating members.

12. In combination with an optical instrument having a body and a lens carrier movably mounted therein, lens focusing means comprising a tube removably received in the camera body, said tube having a longitudinal slot, a manually operable cylinder rotatably mounted in said tube, disengageable operative interconnecting means between said cylinder and said movable lens carrier, there being a spiral groove in the surface of said cylinder, a distance scale on the spiral surface of said cylinder, and a scale indicating member having a screw thread element engaging said spiral groove and a projecting part working in the longitudinal slot in the cylinder carrying tube, the camera body having an aperture exposing to view the tube slot and indicating member working therein.

13. In combination with an optical instrument having a body and a lens carrier movably mounted therein, lens focusing means comprising a tube removably received in the camera body, said tube having a longitudinal slot, a manually operable cylinder rotatably mounted in said tube, driving means for said lens carrier operatively engaged by the cylinder when the cylinder carrying tube is inserted in the camera body, a screw thread cut on said cylinder, an indicating member screw threadedly engaging said cylinder and arranged for translation in the longitudinal slot in said tube when the cylinder is rotated, and a distance scale followed by said traveling indicating member.

14. In combination with an optical instrument having a body and a lens carrier movably mounted therein, lens focusing means comprising a tube removably received in the camera body, said tube having a longitudinal slot, a manually operable cylinder rotatably mounted in said tube, driving means for the lens carrier keyed to the inner end of said cylinder when the cylinder carrying tube is inserted in the camera body, a screw thread cut on said cylinder, an indicating member screw threadedly engaging said cylinder and arranged for translation in the longitudinal slot in said tube when the cylinder is rotated, and a distance scale followed by said traveling indicating member.

15. In combination with an optical instrument having a body and a lens carrier movably mounted therein, lens focusing means comprising a tube removably received in the camera body, said tube having a longitudinal slot, a manually operable cylinder rotatably mounted in said tube, driving means for said lens carrier operatively engaged by the cylinder when the cylinder carrying tube is inserted in the camera body, there being a spiral groove cut in the surface of said cylinder, a distance scale on the spiral surface of said cylinder, and a scale indicating member having a screw thread element engaging said spiral groove and a projecting part working in the longitudinal slot in the cylinder carrying tube.

16. In combination with an optical instrument having a body and a lens carrier movably mounted therein, lens focusing means comprising a tube removable received in the camera body, said tube having a longitudinal slot, a manually operable cylinder rotatably mounted in said tube, driving means for the lens carrier keyed to the inner end of said cylinder when the cylinder carrying tube is inserted in the camera body, there being a spiral groove cut in the surface of said cylinder, a distance scale on the spiral surface of said cylinder, and a scale indicating member having a screw thread element engaging said spiral groove and a projecting part working in the longitudinal slot in the cylinder carrying tube.

In witness that I claim the foregoing I have hereunto subscribed my name this 1st day of May 1931.

GEORGE A. MITCHELL.